United States Patent [19]

Airhart

[11] Patent Number: 4,967,870

[45] Date of Patent: * Nov. 6, 1990

[54] ALIGNMENT RESTORATION MEANS FOR USE IN SEISMIC APPARATUS

[75] Inventor: Tom P. Airhart, Plano, Tex.

[73] Assignee: Atlantic Richfield Company, Los Angeles, Calif.

[*] Notice: The portion of the term of this patent subsequent to Jan. 26, 2005 has been disclaimed.

[21] Appl. No.: 295,658

[22] Filed: Jan. 9, 1989

[51] Int. Cl.$^5$ .............................................. G01V 1/04
[52] U.S. Cl. .................................... 181/121; 181/401; 367/191; 248/638
[58] Field of Search ............... 181/108, 112, 113, 114, 181/121, 139, 401; 367/189, 190, 191; 248/638, 678

[56] References Cited

U.S. PATENT DOCUMENTS

| | | | |
|---|---|---|---|
| 3,899,281 | 8/1975 | Jakobs | 181/121 |
| 4,108,270 | 8/1978 | Mifsud | 181/114 |
| 4,116,300 | 9/1978 | Stone | 181/114 |
| 4,248,324 | 2/1981 | Mifsud | 181/121 |
| 4,284,164 | 8/1981 | Airhart | 181/117 |
| 4,284,165 | 8/1981 | Airhart et al. | 181/119 |
| 4,402,381 | 9/1983 | Airhart | 181/114 |
| 4,484,657 | 11/1984 | Barta | 181/121 |
| 4,485,889 | 12/1984 | Bays | 181/121 |
| 4,660,674 | 4/1987 | Airhart | 181/113 |
| 4,662,473 | 5/1987 | Betz | 181/113 |
| 4,683,558 | 7/1987 | Karner | 367/189 |
| 4,702,344 | 10/1987 | Airhart | 181/121 |
| 4,712,641 | 12/1987 | Chelminski | 181/113 |
| 4,721,181 | 1/1988 | Airhart et al. | 181/114 |
| 4,739,857 | 4/1988 | Airhart | 181/113 |
| 4,766,974 | 8/1988 | Cole et al. | 181/113 |
| 4,771,858 | 9/1988 | Goodloe | 181/114 |

Primary Examiner—Brian S. Steinberger
Attorney, Agent, or Firm—Roy L. VanWinkle

[57] ABSTRACT

Alignment restoring apparatus for use with seismic shock generators that includes a support frame, a lift frame supported by the support frame, a seismic generator peripherally supported by the lift frame, and a base plate supported by the life frame and arranged to be impacted by the seismic generator. The alignment restoring apparatus includes biasing means located between the lift frame and the base plate to provide a restoring force upon movement of the frame relative to the base plate whereby the initial relationship between the frame and base plate is re-established assuring that the time lapse from initiating the propulsion of the seismic generator toward the base plate to the time of impact therebetween is repeatable.

21 Claims, 3 Drawing Sheets

ALIGNMENT RESTORATION MEANS FOR USE IN SEISMIC APPARATUS

TECHNICAL FIELD OF THE INVENTION

This invention relates generally to apparatus for generating seismic signals. More particularly, but not by way of limitation, this invention relates to apparatus for restoring the alignment between a base plate and an impact device used to create seismic signals.

BACKGROUND OF THE INVENTION

In impact-type apparatus for generating seismic signals, a weight, usually in the neighborhood of 5,000 pounds, is propelled at high speed at a base plate which is located in engagement with the surface of the ground. Naturally, the initiation of propulsion of weight of this magnitude and its impact with the base plate creates large dynamic forces, with reaction forces occurring as a result thereof.

In apparatus of this type, the base plate is generally shock-isolated from a frame which supports the movable weight and the means for propelling the movable weight. Accordingly, it is possible for relative movement to occur between the base plate and the frame supporting the movable weight as a result of either the impact between the weighted member and the base plate or the reaction forces.

During the early development of impact-type apparatus, the weight was propelled vertically into a generally horizontally disposed base plate. Although there could be some relative movement, the base plate tended to remain in a relatively fixed position with respect to the frame supporting the weighted member. Recently, however, it has been determined that it is desirable to set the axial centerline of the weighted mass and the propulsion means at an angle relative to the surface of the base plate. When used in this manner, vector forces along the ground surface are created, which tend to cause or at least aggravate the problem of maintaining the base plate in alignment with the propelled mass.

Such apparatus are referred to as full waveform seismic sources and one such apparatus is illustrated in U.S. Pat. No. 4,660,674 issued on Apr. 28, 1987 to Tom P. Airhart. U.S. Pat. No. 4,721,181 issued on Jan. 26, 1988 to Tom P. Airhart illustrates one attempt to compensate for such movement.

In addition, it is frequently desirable to generate the seismic signals on uneven terrain. If, for example, a vehicle carrying a seismic signal generator is setting on a hillside, the weight of the vehicle will not be directly over the base plate and, thus, aggravates the problem created by tilting the actuator.

The problem has become further aggravated because it is now desirable to utilize a multiplicity of such devices, usually on different vehicles, to create the seismic shock. To provide the highest quality seismic signal, each of the masses must strike the base plate at precisely the same time.

In an effort to prevent excessive recoil motion of the vehicle, the weight of the vehicle is shock isolated against the base plate. Even though such apparatus weighs many thousands of pounds, a reaction force still occurs that can cause movement between the supporting structure or frame and the base plate. If such movement occurs, the mass will not strike the base plate in the same position along the same path each time such that it will not strike at an accurately predictable and repeatable time from initiation of propulsion to impact.

The importance of having propelled masses of multiple units impact the plates at precisely the same time can be appreciated by those skilled in the art of the interpretation of the seismic traces. Specifically, it is important that the seismic traces, which are recorded by geophones positioned at specified distances from the source of the seismic signal, be as highly defined as possible. In the event that the masses do not strike the base plates at the same time, more than one seismic signal is generated in very close sequence, producing a rather fuzzy or blurred seismic trace as recorded by the instruments. Such blurred traces are more difficult to interpret and are more difficult to use in the computer systems processing such signals. It is sometimes desirable or necessary to utilize signals of opposite polarity for the purpose of cancelling noise and other undesirable signals that may occur or may be picked up by the geophones. If more than one signal is generated, it may be difficult or impossible to conveniently handle the signals in processing.

SUMMARY OF THE INVENTION

It is, therefore, an object of this invention to provide means for restoring the relationship between the base plate and the frame supporting the impact apparatus to produce highly defined seismic signals even when multiple impactors are used.

This invention, then, provides restoration apparatus for use in a seismic signal generator which includes a movable impact member, a base plate arranged to be impacted by the impact member, support for the movable impact member and the base plate, and apparatus for initiating the propulsion of the impact member toward the base plate. The invention includes biasing apparatus operably connected with the support and the base plate for restoring the alignment therebetween so that the impact member will strike or impact the base plate at the same position after traversing the same path during repetitive actuation of the impact member and whereby the time lapse between initiation of the propulsion and the impact of the impact member on the base plate is repeatable.

BRIEF DESCRIPTION OF THE DRAWING

The foregoing, and additional objects and advantages of the invention will become more apparent when the following detailed description is read in conjunction with the accompanying drawing, wherein like reference characters denote like parts in all views and wherein.

DETAILED DESCRIPTION OF THE EMBODIMENT OF FIG. 1

Figure 1:
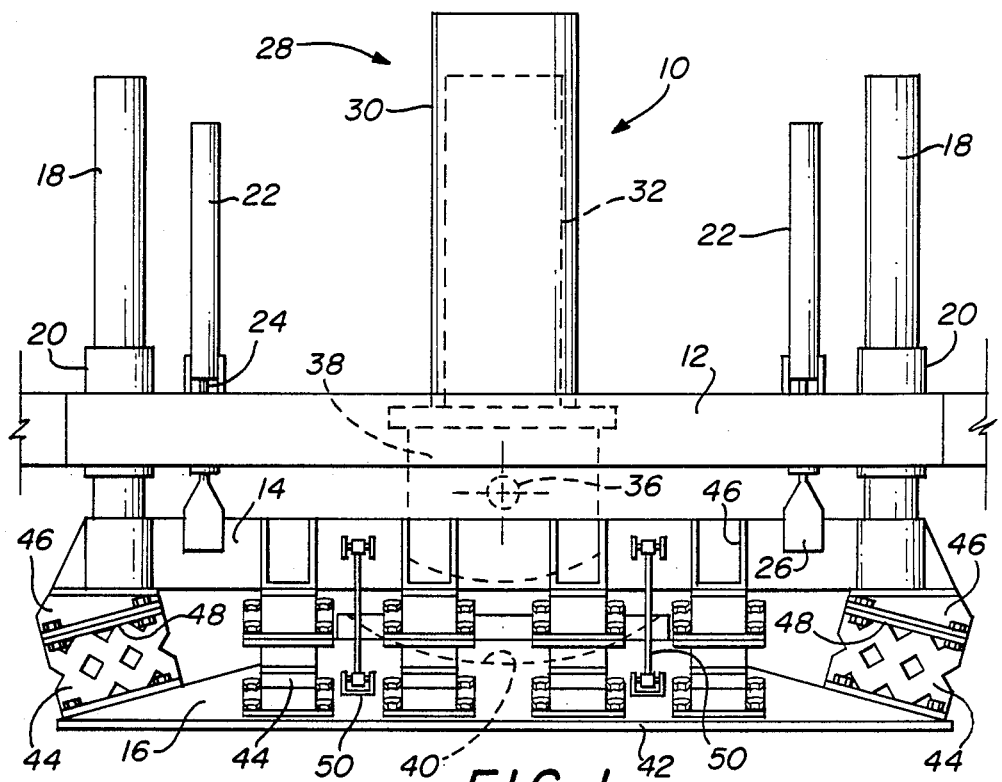
FIG. 1 is an elevation view of a seismic device that incorporates one form of alignment restoration apparatus that is constructed in accordance with the invention.

The partial elevation view of FIG. 1 illustrates impact-type seismic apparatus that is generally designated by the reference character 10. The apparatus 10 includes a support frame 12 which may, in the case of mobile units, be a truck frame. The apparatus 10 also includes a lift frame 14 arranged to support a base plate 16.

The lift frame 14 includes a plurality of guide posts 18 that extend through sleeves 20 mounted on the support frame 12. The guide posts 18 are slidable through the sleeves 20 so that the frame 14 and base plate 16 supported thereby can be moved relative to the support frame 12. To cause the movement of the lift frame 14 relative to the support frame 12, a plurality of double-acting, hydraulic cylinders 22 are mounted on the support frame 12. Each of the cylinders 22 includes a piston 24 having a lower end 26 connected to the frame 14. Actuation of the cylinders 22, by means not shown, causes the pistons 24 to move upwardly or downwardly therein, and through the attachment of the lower end 26 thereof with the frame 14, causes upward or downward movement of the frame 14.

The apparatus 10 also includes an impact apparatus generally designated by the reference character 28 that includes a housing 30. Mounted for reciprocating movement in the housing 30 is an impact member 32 shown in dash lines. The member 32 usually weighs several thousand pounds. The housing 30 is pivotally supported by the lift frame 14 through appropriate gimbal mounts or the like.

Figure 2:
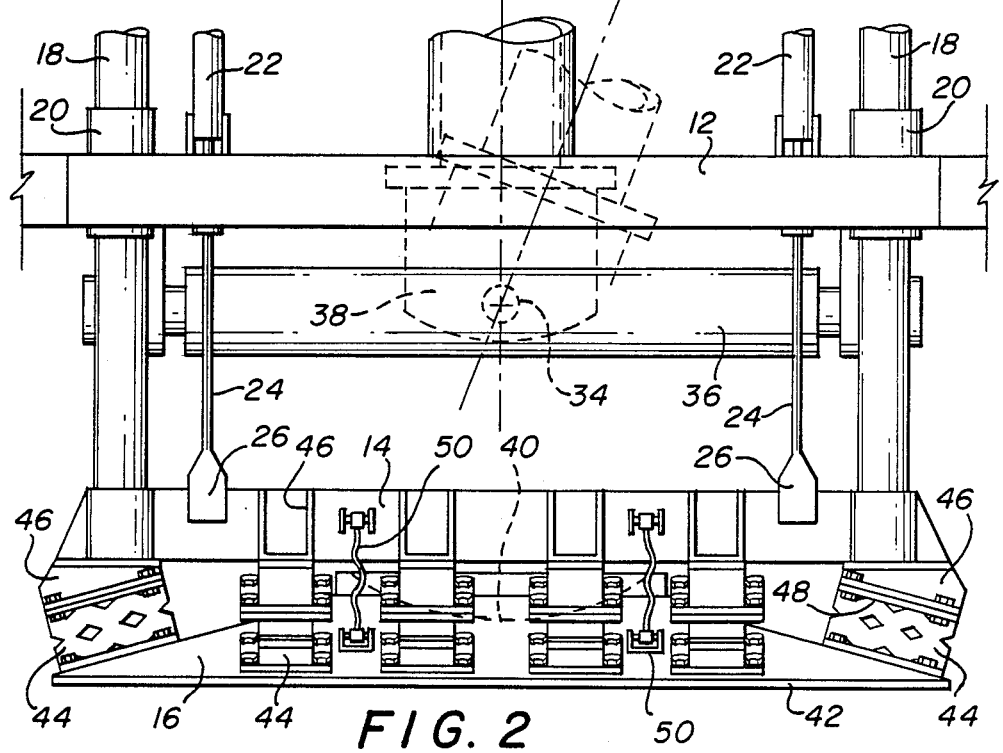
FIG. 2 is a view similar to FIG. 1, but illustrating the apparatus in another operating position.

As shown more clearly in FIG. 2, the impact apparatus 28 is pivotal about an axis 34 shown in dash lines ad about an axis 36 (also shown in dash lines in FIG. 1) which extends perpendicularly to the axis 34. The arrangement is such that the impact apparatus 28 can be positioned at any desired angle (within a specified range) and at any asmuith desired. A suitable pivotal mounting and control arrangement is illustrated in U.S. Pat. No. 4,660,074.

A head 38 on the lower end of the impact member 32 is arranged by means known in the art to be driven into a concave surface 40 located on the upper surface of the base plate 16. A suitable propulsion arrangement is illustrated in U S. Pat. No. 4,702,344.

In the operation of the apparatus 10, cylinders 22 are actuated to lower the base plate 16 so that a lower surface 42 thereon is brought into engagement with the ground as illustrated in FIG. 2. Actuation of cylinders 22 continues until the support frame 12 is lifted to an appropriate height to raise the entire vehicle off the ground whereby the weight thereof is placed on the base plate 16.

It is desirable that the lift frame 14 and support frame 12 be shock-isolated from the base plate 16 when the impact member 32 is brought into engagement with the base plate 16. Accordingly, a plurality of shock-isolating, biasing members 44 are, as illustrated on FIGS. 1 and 2, mounted between the frame 14 and the base plate 16. The biasing members 44 are preferably constructed from a resilient material, and are somewhat honeycombed as illustrated to provide more flexibility. Each member 44, except for those portions removed to form the honeycomb, may be considered as a right hexahedron. The members 44 have substantial strength and stiffness in the compressive direction, but possess somewhat lower rigidity in the shear mode, that is, in a direction generally parallel to the base plate 16.

To support the biasing members 44 at an angle compatible to the base plate 16, that is, relative to horizontal, an angularly disposed adapter 46 is located on the underside of the frame 14 at spaced positions about the periphery of the base plate 16. Each of the adapters 46 is provided with a lower surface 48 that is oriented to maintain the members 44 in the angular position illustrated. One effect of positioning a pluralitY of the members 44 about the outer periphery of the base plate 16 and angled as illustrated, is to maintain the frame 14 and the base plate 16 in the initial relationship illustrated in FIG. 1.

In order to prevent possible damage or destruction of the members 44 upon lifting of the frame 14 and the base plate 16, a plurality of tension members 50 are shown located in spaced relation between the frame 14 and the base plate 16. When the plate is being lifted by the frame 14, the tension members 50 support the weight of the base plate 16 without imposing very much force on the members 44. As can be seen in FIG. 2, the tension members 50 are slack since the weight of the support structure 12 has been set upon the frame 14 and, consequently, onto the base plate 16 through the members 44 which have been deformed in compression. With the members 44 fastened to the frame 14 and base plate 44 the tension members 50 can be omitted if desired.

Figure 3:
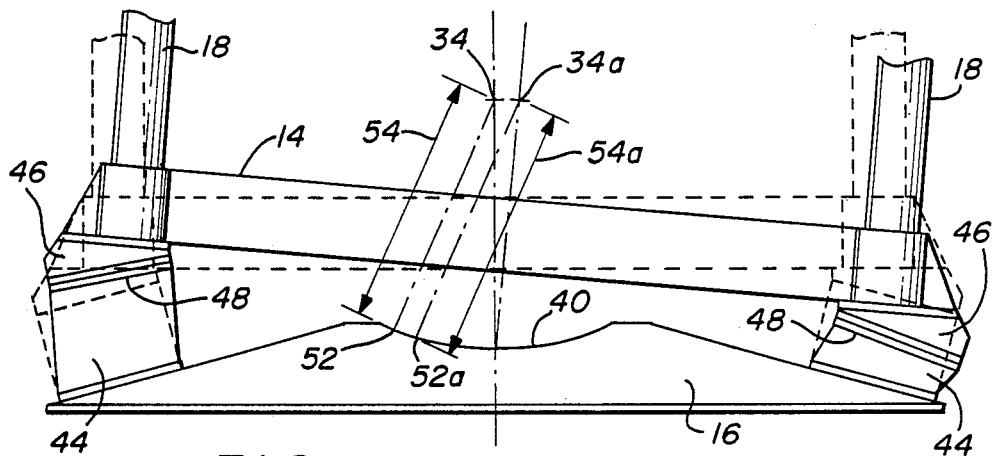
FIG. 3 is a fragmentary view similar to FIGS. 1 and 2, but illustrating the apparatus schematically in an operational mode.

The schematic view of FIG. 3 illustrates the displaced and restored positions of the frame 14 relative to the base plate 16. More importantly, the main criteria is restoration of the pivot 34 of the impact apparatus 28, relative to the base plate 40.

Movement of the vehicle or other structure supported by the base plate 16 and frame 14 to the right (as seen in FIG. 3) has occurred. This is clearly illustrated by the movement of the pivot point 34 to the position 34a, and by the relief of loading on the biasing member 44 shown at the left in FIG. 3 as compared to the compressive loading and deformation of the biasing member 44 on the right side of FIG. 3. Solid lines illustrate the shifted position of the components. The dash line overlaid thereon illustrates the restored position of the components essentially to their original positions.

It will be appreciated that while it is important to maintain the relative position between the frame 14 and the base plate 16, the important consideration is that pivot axis 34 be maintained in the same position relative to an impact point 52 on the concave surface 40 of the base plate 16. While the time of firing or triggering of the impact member 32 can be controlled, the travel distance of the impact member 32 to impact with the base plate 40 must be the same or multiple seismic traces will occur as discussed hereinbefore.

It can be seen that the first impact is made after travel over the distance 54 extending from the pivot point 34 to the impact point 52 and that the second impact is made after travel from the shifted pivot point 34a to a new impact point 52a. A new distance 54a is actually traveled in the second instance which generally will be longer than the distance 54. Accordingly, impact occurs at a later time resulting in fuzzy or blurred seismic traces when several of the apparatus 10 are used to create the shock.

DESCRIPTION OF THE MODIFICATION OF FIG. 4

Figure 4:
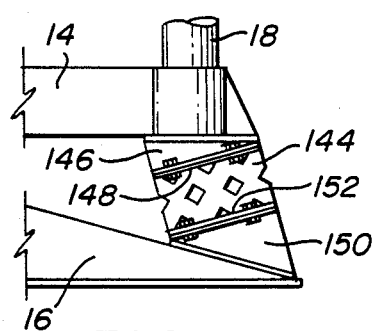
FIG. 4 is an enlarged fragmentary view illustrating a modification of the apparatus of FIG. 1.

The fragmentary view of FIG. 4 illustrates but one of the shock-isolating, biasing members 44. It will be understood that the structure is as illustrated in FIGS. 1 and 2 with the modifications described below. The same reference characters will be utilized in FIG. 4 as previously used where the parts remain the same.

A modified form of adapter 146 has been formed on the lower side of the lift frame 14 providing a downwardly and outwardly facing lower surface 148. The base plate 16, if used as previously described, must have an upstanding base member 150 formed thereon which provides an upwardly and inwardly facing surface 152. The shock-isolating member 44 is located between the surfaces 148 and 152 and may be attached thereto by threaded fasteners as illustrated.

The modification of FIG. 4 operates in essentially the manner previously described except that the compressive force loads exerted by the biasing members 44 are now exerted in a direction relatively away from the center of the base plate 16 instead of toward the center of the base plate 16 as was true of the arrangement of FIGS. 1 and 2.

DESCRIPTION OF THE EMBODIMENT OF FIG. 5

Figure 5:
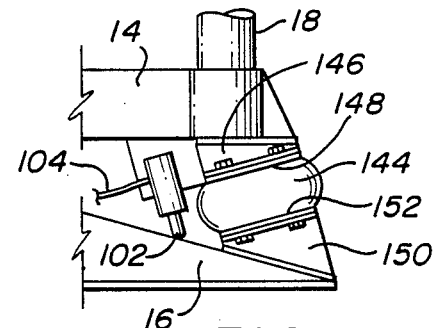
FIG. 5 is an enlarged fragmentary view of another embodiment of alignment restoration apparatus that is also constructed in accordance with the invention.

FIG. 5 illustrates structural apparatus similar to that just described in connection with the modification of FIG. 4. However, in lieu of the shock-isolating, biasing member 44, a pneumatic cushion 144 is located between the surfaces 148 and 152.

Also illustrated in FIG. 5 is a sensor 100 which is suitably mounted on the lower surface of the frame 14. The sensor 100 includes a probe 102 which extends downwardly into engagement with the surface 152 or with an appropriate surface on the base plate 16. The sensor 100 is provided to sense changes in the distance between the frame 14 and the base plate 16 and to transmit signals proportional thereto over a conductor 104. It will, of course, be understood that FIG. 5 illustrates only one pneumatic cushion 144 and one sensor 100. As many cushions 144 and sensors 100 as desired may be utilized in connection with apparatus such as that illustrated in FIGS. 1 and 2.

Figure 6:
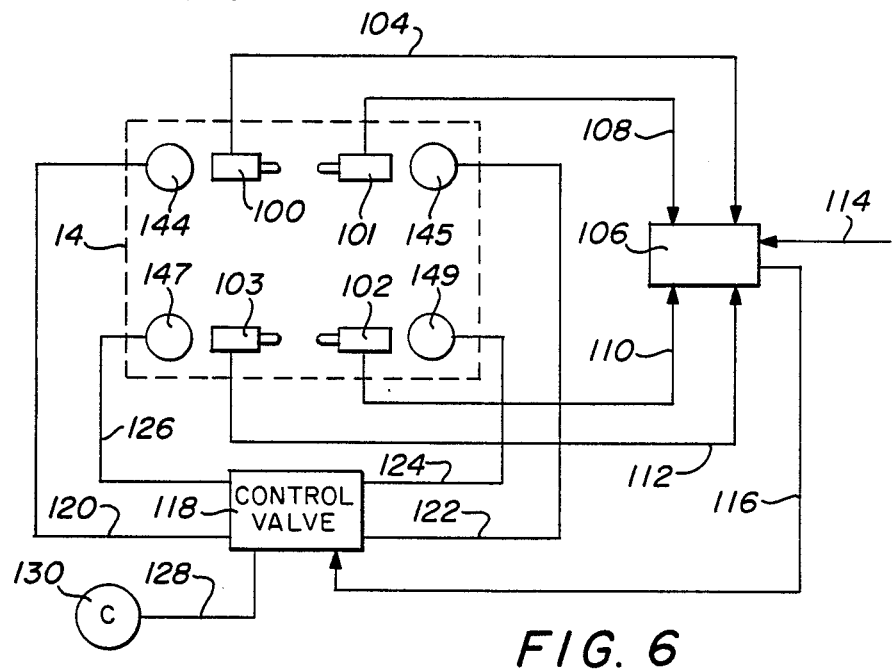
FIG. 6 is a schematic diagram illustrating a pneumatic circuit for controlling the apparatus illustrated in FIG. 5.

The schematic view of FIG. 6 shows pneumatic cushions 144, 145, 147 and 149 as being located on the frame 14. Similarly, sensors 100, 101, 102 and 103 are illustrated schematically as being located on the frame 14 adjacent to the pneumatic cushions. The sensor 100 is connected by the conductor 104 with appropriate electronic apparatus 106. Similarly, the sensors 101, 102 and 103 are connected by conductors 108, 110 and 112, respectively with the electronic apparatus 106. The arrangement is such that the electronic apparatus 106 receives signals from the sensors 100 indicative of the relative spacing between the frame 14 and the base plate 16. Those signals are then manipulated within the apparatus 106 to transmit appropriate signals to maintain the initial relationship between the frame 14 and 16. A signal 114, which has also been fed into the apparatus 106, may be utilized to indicate the initial relationship. In the event that the signals received from the various sensors do not compare with the signal 114, a correction signal is transmitted from the apparatus 106 through a conductor 116 to a control valve 118. The control valve is connected by conduits 120, 122, 124 and 126 with the respective pneumatic cushions 144, 145, 147 and 149. The control valve 118 is also connected by a conduit 128 with a compressor 130.

It will be understood that the apparatus, when in operation, will be disposed as previously described in connection with the description of FIGS. 1 and 2 and that the air cushions have been previously filled with pressurized air to some extent. Accordingly, such air cushions will inherently have a restoring force, as was true with the shock-isolating, biasing members 44, to provide restoration forces urging the frame 14 to move relative to the base plate 16. By using the pneumatic cushions, it is possible that a further, positive force can be generated through the system described in connection with FIG. 6 to impose relatively large forces to restore the initial relationship between the member 14 and base plate 16.

For example, if the centers have shifted as described in connection with FIGS. 3 so that the weights of the vehicle and frame 14 are toward the air cushions 145 and 146, the sensors 101 and 102 sense that the dimension between the frame 14 and the base plate 16 has been reduced. A proportional signal is transmitted from the sensors 101 and 102 to the electronic apparatus 106. In the electronic apparatus 106, a corrective signal is generated and transmitted over the conductor 116 to the control valve so that additional compressed air is delivered from the compressor 130 to the pneumatic cushions 145 and 149 through the conduits 122 and 124, respectively. Similarly, the corrective signal actuates the control valve, if necessary, to reduce the pressure in the conductors 144 and 147 and thus permit restoration of the frame 14 relative to the base plate 16 to the initial relationship therebetween.

It will, of course, be understood that the air cushions 144 may be arranged about the base plate 16 in the manner indicated by and instead of the shock-isolating members 44 shown in FIGS. 1 and 2.

DESCRIPTION OF THE EMBODIMENT OF FIG. 7

Figure 7:
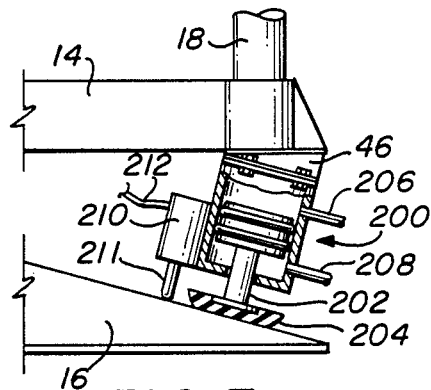
FIG. 7 is another embodiment of alignment restoration apparatus that is also constructed in accordance with the invention.

Referring to FIG. 7, a double-acting hydraulic cylinder assembly generally designated by the reference character 200 has been substituted for the shock-isolating, biasing members 44 of FIGS. 1 and 2. The same reference characters will be used on all unmodified parts as were used in the description of FIGS. 1 and 2.

The hydraulic cylinder assembly 200 has its upper end connected to the adapter 46. A piston 202 projects from the cylinder 200 toward the upper surface of the base plate 16. A pad or shock absorber 204 has been mounted on the lower end of the piston 202 between the piston 202 and the surface of the base plate 16. Conduits 206 and 208 extend from the cylinder assembly 200 for the purpose of providing hydraulic fluid for moving the piston 202 in the appropriate direction.

Connected to one side of the cylinder 200 is a sensor 210 which has been selected to transmit a signal over the conductor 212 that is indicative of the position of a probe 211, that is, a signal is transmitted therefrom which will be indicative of the distance between the frame 14 and the base plate 16.

Figure 8:
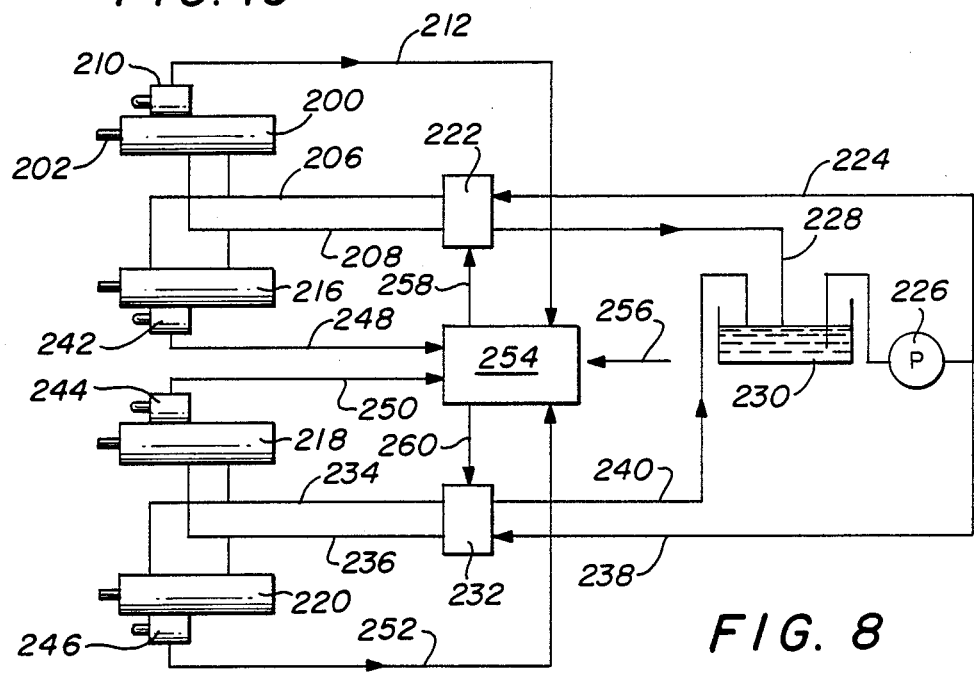
FIG. 8 is a schematic diagram illustrating a hydraulic circuit that is suitable for use with the embodiment of FIG. 7.

FIG. 8 illustrates a system for utilizing the cylinders 200 for restoring the initial relationship between the frame 14 and the base plate 16. As illustrated therein, four cylinders 200, 216, 218 and 220 are illustrated. If only four of the cylinders are utilized, their location would most likely be adjacent the corners of the frame 14 and the base plate 16. However, as many of the cylinders can be utilized as desired.

For the purpose of illustration, the four cylinders are illustrated in FIG. 8 as being connected in opposed pairs, that is, the cylinder 200 is located in one corner of the frame 14 while the cylinder 216 is located in an opposite corner so that the cylinders work together in moving the frame 14 relative to the base plate 16. Similarly, the cylinders 218 and 220 also work in opposed pairs.

For the purpose of actuating the cylinders 200 and 216, the conduits 206 and 208 are connected to the same control valve 222 which receives pressurized hydraulic fluid through a conduit 224 from a hydraulic pump 226. Hydraulic fluid is returned from the control valve 222 through a conduit 228 to a reservoir 230.

Similarly, the cylinders 218 and 220 are connected to a control valve 232 by conduits 234 and 236. In turn, the control valve 232 is connected to the pump 226 by a conduit 238 and with the reservoir 230 by a conduit 240.

To control the supply of pressurized fluid to the valves 222 and 232 and, consequently, to the cylinders, each of the cylinders has been provided with a sensor. The cylinder 200 is provided with a sensor 210 as previously mentioned, the cylinder 216 with a sensor 242, the cylinder 218 with a sensor 244, and the cylinder 220 with a sensor 246. The sensors 242, 244, and 246 are connected by conductors 248, 250, and 252, respectively, with electronic control apparatus 254. An arrow 256 is indicative of a base signal or a signal entered into the system 254 for indicating the initial and desired relationship between the frame 14 and the base plate 16. The electronic apparatus 254 is connected by conductors 258 and 260 with the control valves 222 and 232, respectively.

The arrangement of the control system of FIG. 8 is such that movement of the frame 14 relative to the base plate 16 results in movement of the pistons in each of the cylinders and in a subsequent transmittal by the sensors of signals to the electronic apparatus 254. In the electronic apparatus 254 those signals are compared to the desired or initial relationship between the frame 14 and the base plate 16. If they differ, appropriate signals are transmitted through the conductors 258 and 260 to the control valves 222 and 232. Pressurized hydraulic fluid is provided through the appropriate conduit to move the pistons and the cylinders to reposition the frame 14 relative to the base 16 and into the initial relationship.

It will, of course, be understood that if desired, the cylinders need not be connected in pairs as illustrated in FIG. 8. Instead, each of the cylinders can be provided with its own control valve so that each cylinder operates independently from the others.

DESCRIPTION OF THE EMBODIMENT OF FIG. 9

Figure 9:
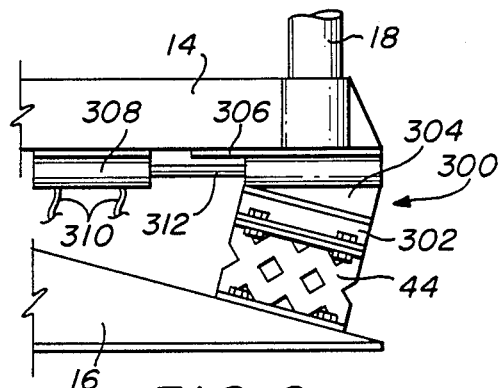
FIG. 9 is a fragmentary elevational view of still another embodiment of alignment restoration apparatus that is also constructed in accordance with the invention.

The fragmentary view of FIG. 9 illustrates another apparatus for realigning the frame 14 and base plate 16 to their initial position relative to each other. Parts which are the same as those previously described will be designated by the same reference characters in the description of FIG. 9.

As illustrated in FIG. 9, the shock-isolating members 44 are mounted on the base plate 16 at the angle defined by the upper surface thereof or at any other angle desired. An upper adapter assembly is generally designated by the reference character 300 and is located between the upper surface of the shock-isolating, biasing member 44 and the lower surface of the frame 14.

The upper adapter assembly 300 includes a lower portion 302 that is attached to the member 44 and an upper, movable portion 304. Suitable ways 306 are mounted on the frame 14 for slidably receiving the upper, movable portion 304 of the adapter assembly 300.

Connected to the upper, movable portion 304 is a double-acting, hydraulic cylinder 308 that is mounted on the lower surface of the frame 14. The hydraulic cylinder 308 is provided with conduits 310 which function to deliver fluid to and from the cylinder 308 as necessary to cause a piston 312, which is reciprocally located in the cylinder 308, to function.

Although not illustrated, sensors may be utilized with the apparatus illustrated in FIG. 9 to provide a signal that is indicative of the distance between the frame 14 and base plate 16 so that the distance therebetween can be returned to the initial relationship in the event that a shift occurs after impact.

Figure 10:
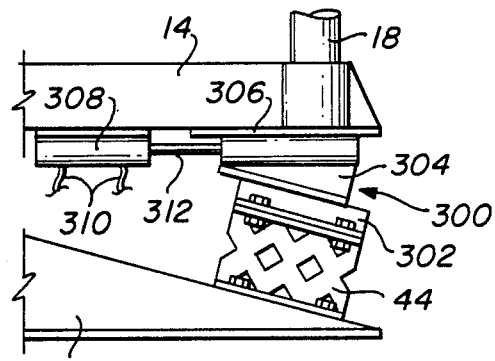
FIG. 10 is a view similar to FIG. 9, but illustrating the apparatus of FIG. 9 in another operating position.

In operation, FIG. 9 represents a situation wherein the distance between the frame 14 and base plate 16 has closed, that is, the shock-isolating, biasing member 44 has been deformed in a compressive mode. Either manually, or automatically if sensors are utilized, the cylinder 308 is actuated to move the piston toward the left as seen in FIGS. 9 and 10 sliding the upper, movable portion 304 toward the left. Since the lower surface of the portion 304 is at an angle relative to the lower surface of the frame 14, movement of the portion 34 to the left moves the frame 14 upwardly and away from the member 44.

From the foregoing, it will be appreciated that if a sufficient number of the adapter assemblies are utilized in spaced relationship around the periphery of the frame 14 and base plate 16, forces can be exerted in appropriate directions to cause the frame 14 to resume its initial position relative to the base plate 16.

DESCRIPTION OF THE MODIFICATION OF FIG. 11

Figure 11:
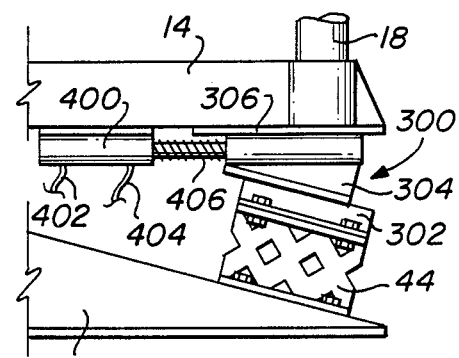
FIG. 11 is a fragmentary view similar to FIG. 9, but illustrating a modification of the apparatus of FIG. 9.

The fragmentary view of FIG. 11 illustrates a modification to the apparatus of FIGS. 9 and 10. The same reference characters will be used on unmodified parts in FIG. 11 as were used on the same parts in connection with the other figures.

As will be evident from viewing FIG. 11, the alignment restoration apparatus illustrated therein is basically the same as that illustrated in FIG. 9. The apparatus of FIG. 11 includes the adapter assembly 300 that functions in conjunction with the frame 14 and the shock-isolating, biasing member 44 as described in connection with FIGS. 9 and 10.

The modification of FIG. 11 as compared to the apparatus of FIG. 9 is that instead of the cylinder 308 for actuating the upper, movable portion 304 of the adapter assembly 300, the apparatus of FIG. 11 includes a stepping motor 400 that is actuated through conductors 402 and 404 to drive a screw 406. The screw 406 is threadedly connected with the upper, movable portion 304 and causes it to move to the left and right as viewed in FIG. 11.

When it is desired to use the apparatus of FIG. 11, the stepping motor 400 is actuated either manually or through a sensor circuit (if desired) to rotate the screw 406 either moving the upper, movable portion 304 of the adapter assembly 300 to the left causing the frame 14 to move upwardly with respect to the base plate 16 (see FIG. 10) or to the right permitting the frame 14 to move toward the base plate 16 as necessary to restore the initial position of the frame 14 relative to the base plate 16.

Various embodiments and modifications thereof have been described that function to restore the initial alignment of the frame 14 with the base plate 16 or, as pointed out clearly with respect to FIGS. 1 and 2, to restore the pivotal center of the impact mechanism with respect to the impact point on the base plate so that the same distance will be traversed by the impact member each time that it is fired toward the base plate. Each embodiment described is capable of performing the restoration. As will be appreciated, several of the embodiments relate to self-contained devices wherein only the resiliency of the member is utilized to provide the restoring force. In other embodiments, a positive force is exerted utilizing an outside source of energy for the purpose of providing the restoration. In still other embodiments, a combination of the self-contained restoration forces is utilized in conjunction with the exertion of outside forces to restore the initial alignment of the apparatus.

Each of the described apparatuses functions to provide the desired restoring forces. Some may provide adequate restoring forces when the seismic apparatus is to be used on relatively flat surfaces while others may be necessary when the seismic apparatus is to be used on uneven terrain.

The various embodiments and modifications of the invention as described in detail here and before are presented by way of example only, and many changes and modifications can be made thereto without departing from the spirit or scope of the invention.

What is claimed is:

1. An apparatus for producing a seismic signal, wherein the apparatus includes a weighted, movable impact member, a frame for supporting a housing containing the impact member for movement about a pivot axis, a ground-engaging base plate supported by said frame and having an impact point in an initial relationship relative to said pivot axis and not directly connected to said housing, propulsion means for driving the movable impact member into shock engagement with the base plate when the base plate is in engagement with the ground to create the seismic signal, and means for initiating propulsion of said member into said base plate; the invention including biasing means connected to at least one of said base plate and frame and operable therewith for restoring said initial relationship whereby said movable impact member repeatedly impacts said base plate at substantially the same point on said base plate with the same travel path at repeatable time differences from time of initiation of propulsion to time of impact, said biasing means being located at an angle other than a right angle relative to said support frame whereby a restoring force exerted thereby has force components in a direction to restore the initial relationship between said impact point and pivot axis.

2. The invention of claim wherein said biasing means comprises:
a plurality of biasing members located in spaced relationship to each other and located between said frame and said base plate; and
mounting means connecting said members to said frame, said mounting means including an angularly disposed adapter connected to said frame for each said biasing member whereby said biasing members are located at an angle relative to said frame.

3. The invention of claim 2, wherein each said biasing member comprises a resilient, generally right hexahedron.

4. The invention of claim 3, wherein each said adapter has a lower surface engaging a respective one of said biasing members and, said lower surface is disposed at an angle to face generally toward a plane that extends through the center of said base plate and generally normal to a lower surface of said base plate.

5. The invention of claim 4, wherein each angularly disposed adapter is movable with respect to said frame and wherein the invention also includes base moving means for moving said adaptor relative to said biasing means, frame and base plate to restore said initial relationship.

6. The invention of claim 5, wherein said base moving means includes a cylinder having a movable piston therein, said piston having one end connected to said adapter for moving said adapter upon actuation of said piston.

7. The invention of claim 5, wherein said adapter moving means includes a threaded member rotatably mounted on said frame and having one end connected to said adapter for moving said adapter upon rotation of said threaded member.

8. The invention of claim 3, wherein each said adapter has a lower surface engaging a respective one of said biasing members and, said lower surface is disposed at an angle to face generally away from a plane that extends through the center of said base plate and normal to a lower surface of said base plate.

9. The invention of claim 8, wherein each angularly disposed adapter is movable with respect to said frame and wherein the invention also includes adapter moving means for moving said adapter relative to said biasing means, frame and base plate to restore said initial relationship.

10. The invention of claim 2, wherein each said biasing member comprises an inflatable member.

11. The invention of claim 10, wherein each said adapter has a lower surface engaging a respective one of said biasing members and, said lower surface is disposed at an angle to face generally toward a plane extending through the center of said base plate and generally normal to a lower surface of said base plate.

12. The invention of claim 11 and also including:
a source of pressurized air; and
pneumatic control means connected to said source and to each said inflatable member for varying the pressure in said inflatable member to restore said initial relationship between said impact point and pivot axis.

13. The invention of claim 12, wherein said control means also includes:
a plurality of sensors carried by said frame and spaced about said base plate for sensing the position of said base plate relative to said frame and transmitting a signal representative of such position; and
signal processing means connected with said sensors for receiving said signals and for causing said inflatable members to restore said frame to such position relative to said base plate.

14. The invention of claim 10, wherein each said adapter has a lower surface engaging a respective one of said biasing members and, said lower surface is disposed at an angle to face generally away from a plane that extends through the center of said base plate and normal to a lower surface of said base plate.

15. The invention of claim 14 and also including:
a source of pressurized air; and
pneumatic control means connected to said source and to each said inflatable member for varying the pressure in said inflatable member to restore said initial relationship between said impact point and pivot axis.

16. The invention of claim 15, wherein said control means also includes:
a plurality of sensors carried by said frame and spaced about said base plate for sensing the position of said base plate relative to said frame and transmitting a signal representative of such position; and
signal processing means connected with said sensors for receiving said signals and for causing said inflatable members to restore said frame to such position relative to said base plate.

17. The invention of claim 2, wherein each said biasing member includes:
a hydraulic cylinder; and
a piston movably located therein.

18. The invention of claim 17, wherein:
each piston has a free end engageable with said base plate;
each cylinder is connected to said frame; and
said cylinders are oriented with said pistons extending from said cylinders angularly toward a plane that extends through the center of said base plate and generally normal to a lower surface of said base plate.

19. The invention of claim 17, wherein:
each piston has a free end engageable with said base plate;
each cylinder is connected to said frame; and
said cylinders are oriented with said pistons extending from said cylinders angularly away from a plane extending through the center of said base plate and generally normal to a lower surface of said base plate.

20. The invention of claim 17 and also including:
a source of pressurized hydraulic fluid; and
control means connected to said source and to each said cylinder for varying the pressure in said cylinders to restore said initial relationship between said impact point and pivot axis.

21. The invention of claim 20, wherein said control means also includes:
a plurality of sensors carried by said frame and spaced about said base plate for sensing the position of said bas plate relative to said frame and transmitting a signal representative of such position; and
signal processing means connected with said sensors for receiving said signals and for causing said cylinders to restore said frame to such position relative to said base plate.

* * * * *